United States Patent [19]
Gleim

[11] Patent Number: 6,043,619
[45] Date of Patent: Mar. 28, 2000

[54] METHOD AND CIRCUIT ARRANGEMENT FOR COMMUTATION OF A MULTIPLE WINDING ELECTRIC MOTOR

[75] Inventor: Günter Gleim, Villingen-Schwenningen, Germany

[73] Assignee: Deutsche Thomson-Brandt GmbH, Villingen-Schwenningen, Germany

[21] Appl. No.: 09/209,100

[22] Filed: Dec. 10, 1998

[30] Foreign Application Priority Data

Dec. 19, 1997 [DE] Germany .......................... 197 56 791

[51] Int. Cl.⁷ ...................................................... H02P 1/18
[52] U.S. Cl. ........................... 318/254; 318/138; 318/439
[58] Field of Search .................................... 318/439, 138, 318/254

[56] References Cited

U.S. PATENT DOCUMENTS

| | | | |
|---|---|---|---|
| 4,356,437 | 10/1982 | Saito et al. ............................. | 318/254 |
| 5,182,499 | 1/1993 | Inaji et al. ............................. | 318/254 |
| 5,220,258 | 6/1993 | Hans et al. ............................ | 318/254 |
| 5,319,290 | 6/1994 | Yoshino et al. ....................... | 318/254 |
| 5,382,886 | 1/1995 | Mizuide ................................. | 518/807 |

FOREIGN PATENT DOCUMENTS

| | | | |
|---|---|---|---|
| 44 04 889 A1 | 8/1995 | Germany ...................... | B60L 15/00 |
| 195 42 713 A1 | 5/1997 | Germany ...................... | H02P 7/44 |
| 96/08864 | 3/1996 | WIPO ............................ | H02P 6/10 |

*Primary Examiner*—Brian Sircus
*Assistant Examiner*—Rina I. Duda
*Attorney, Agent, or Firm*—Joseph S. Tripoli; Joseph J. Laks; Daniels E. Sragow

[57] ABSTRACT

Method and circuit arrangement for commutation of a multiple winding electric motor. Particularly when they are operated with square-wave signals, multiple winding electric motors require effective interference voltage suppression for many applications. The invention specifies a method and a circuit arrangement by means of which trapezoidal waveform control signals are produced upstream of the respective output amplifiers, so that the motor is driven with low impedance, as a result of which there is no need for additional suppression means. The trapezoidal waveform control signals are composed of an operating voltage or a corresponding signal, a reference potential and a triangular waveform ramp voltage, using switching means.

14 Claims, 3 Drawing Sheets

METHOD AND CIRCUIT ARRANGEMENT FOR COMMUTATION OF A MULTIPLE WINDING ELECTRIC MOTOR

BACKGROUND OF THE INVENTION

The present invention is based on a method and a circuit arrangement having a controller for commutation of a multiple winding electric motor.

A circuit arrangement of this type has been disclosed, for example, in EP 0 574 435 B1. In this case, a motor having three winding sections is driven by a pulse generator via an output amplifier. Regulation is achieved by a sensor which detects the revolutions of the motor. The pulse generator in this arrangement produces square-wave signals, which cyclically pass through the states +1, 0, −1, 0, +1 etc. Since interference pulses occur at certain transitions between these states, suitable means have to be provided for suppression.

EP 0 259 764 B1 discloses a further circuit arrangement for commutation of an electric motor, which is based on digital circuits. In this case, commutation pulses from a sensor arranged on the motor are used in a counter and an associated logic circuit to produce three phase-shifted signal voltages for driving the three winding sections. These voltages are used in a downstream decoder to generate six phase-shifted signal voltages, from which currents with a square-wave amplitude are produced, via inverters, OR circuits and six switches, and are used to drive the motor. The circuit complexity is relatively high in this case, particularly since the six switches have to switch high currents.

SUMMARY

The object of the present invention is to specify a circuit arrangement for commutation of a multiple winding electric motor, and a method relating to this, which has a low circuit complexity level with good suppression of interference pulses.

The circuit arrangement for commutation in the present invention contains switching means, using which, controlled by a controller, a periodic, trapezoidal waveform control signal for driving a respective winding section is formed from a supply voltage or an appropriate signal, a reference potential and a triangular waveform ramp voltage. This control signal contains no switching pulses with steep edges, so that the inductances in the motor cannot produce any excessive interference voltages. The control signal is formed in particular upstream of the output amplifier of a respective winding section, so that no high currents are switched by the switching means. Furthermore, each winding section is operated by the output amplifier with low impedance at all times, resulting in good additional damping. A signal derived from the supply voltage or a signal generated in some other way may also be used instead of a supply voltage.

The periodic, trapezoidal waveform control signal is produced by cyclic switching from the two voltages and the reference potential, the switching time either being dictated by the controller or being derived from signal pulses from a sensor S arranged on the motor. For example, 24 times are required, at equal time intervals per motor revolution, in order to produce the ramp voltage, for example for a motor having three winding sections. These times govern the times from which the three trapezoidal waveform control signals are formed in order to drive these winding sections, one ramp voltage being sufficient for all three winding sections.

The triangular waveform ramp voltage may be produced, for example, by means of two current or voltage sources of opposite polarity, between which switching takes place periodically, and whose output voltages or currents, respectively, periodically charge and discharge a capacitor. Alternatively, other triangular waveform generators may be used, so that, for example, the ramp voltage can be produced digitally by the controller, by generating a staircase waveform voltage. Since the motor is preferably controlled by a specified control signal amplitude and not by variation of the pulse width (PWM), it is at the same time necessary to ensure that the maximum voltage of the ramp voltage matches the value of the supply voltage.

The production of the supply voltage and of the ramp voltage and the switching means can advantageously be combined together with the controller required for driving and regulation in an integrated circuit, which now requires only a few external components. Applications of the invention include, in particular, use in synchronous motors for consumer electronics, for example those used in video recorders, or for computer equipment.

BRIEF DESCRIPTION OF THE DRAWINGS

The invention is explained in more detail in the following text, by way of example, using schematic drawings, in which.

DESCRIPTION OF THE PREFERRED EMBODIMENTS

Figure 1A:
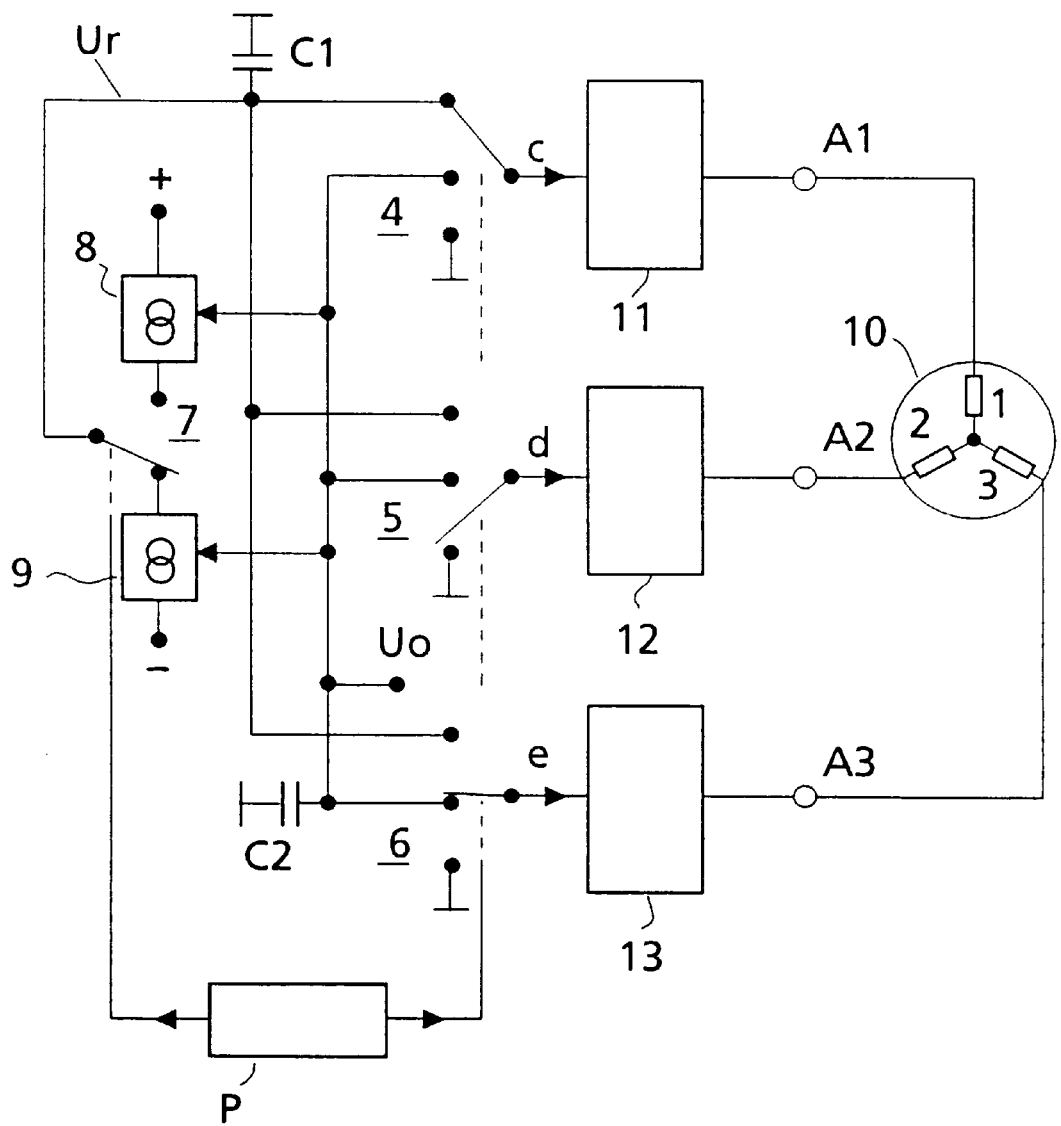
FIG. 1a shows a motor having three winding sections and a circuit arrangement for commutation.
Figure 2:
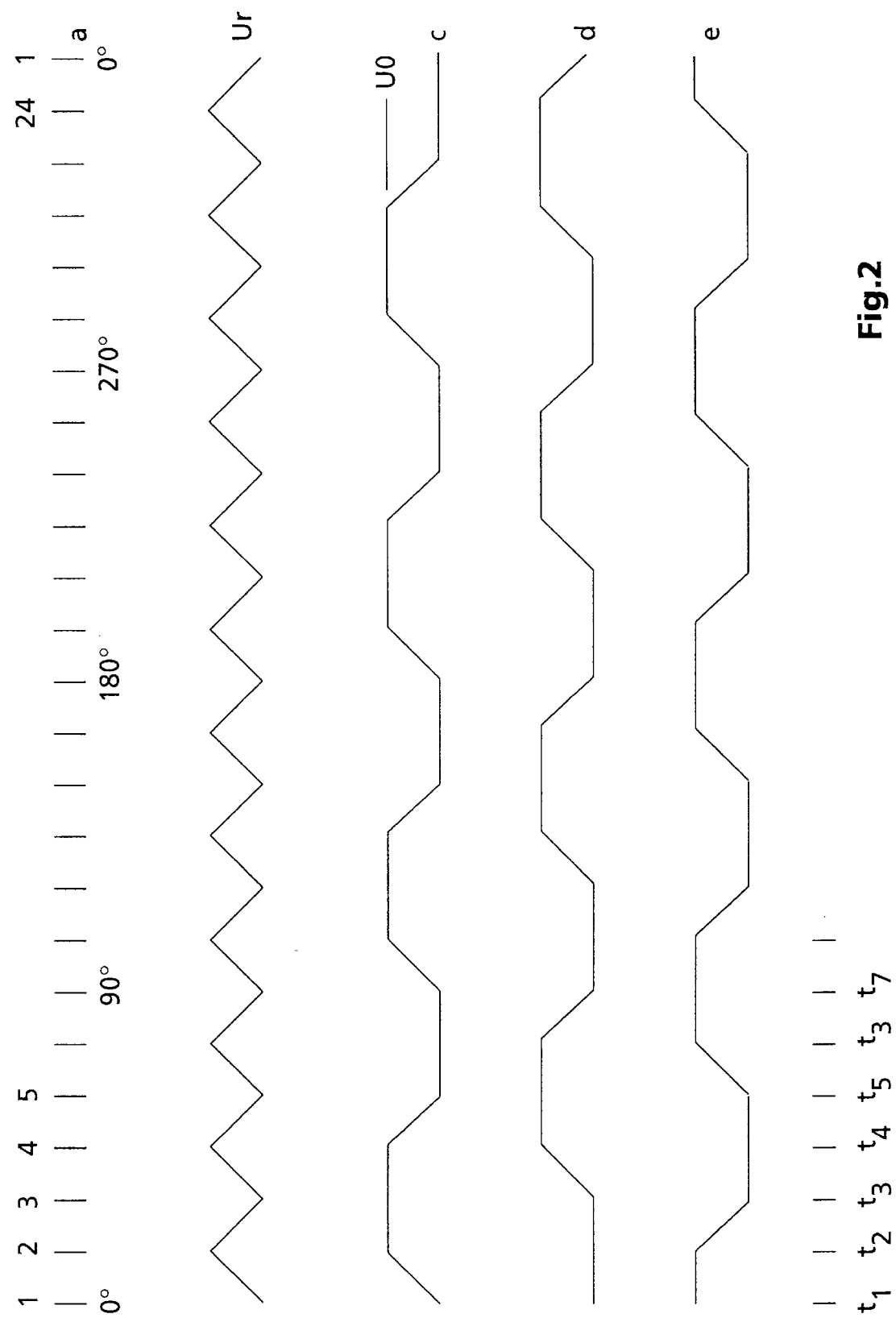
FIG. 2 shows sensor signals from a sensor arranged on the motor, and signals derived from it.

The motor 10 in FIG. 1a contains three winding sections 1, 2, 3, which are driven by output amplifiers 11, 12, 13. These winding sections 1, 2, 3 are driven by periodic, trapezoidal waveform control signals c, d, e, as is illustrated in FIG. 2. These control signals c, d, e are formed from a supply voltage U0 (FIG. 1a), a reference potential, in this exemplary embodiment earth, and a triangular waveform ramp voltage Ur. Alternatively, any desired voltage other than zero may be used as the reference potential, for example −Ur. A controller P controls the production of these control signals c, d, e in the switch 4, 5, 6, on which the above voltages U0 and Ur and earth are respectively present, switching them onwards periodically. The trapezoidal waveform control signal is in this case formed successively from a positive ramp, the positive operating voltage Ur, a negative ramp and earth. The triangular waveform ramp voltage Ur in this case correspondingly has identical voltage levels at the switching times with respect to the operating voltage U0 and earth, so that no discontinuities occur.

The motor 10 is started by the controller P predetermining a low frequency of revolution by means of the switches 4, 5, 6, and increasing this frequency until normal operation is reached at a specific nominal value. The frequency of the ramp voltage can in this case be matched to the low starting frequency during acceleration, in order to avoid abrupt voltage changes during switching. The circuit arrangement for commutation according to FIG. 1a can alternatively be equipped with a sensor which is arranged on the motor and predetermines commutation times which can then be used both in normal operation and during motor starting.

The triangular waveform ramp voltage Ur is produced in this exemplary embodiment using two current sources 8, 9 of different polarity, and a switch 7. The switch 7 is switched periodically between the outputs of the current sources 8, 9 by means of the controller P, so that a triangular waveform ramp voltage Ur is produced using a capacitor C1, which is appropriately charged and discharged. Alternatively, two voltage sources with a resistor in series can also be used instead of the current sources 8, 9 for charging the capacitor C1, or some other triangular waveform generator can be used to produce the ramp voltage Ur. The ramp voltage Ur can also be produced, in particular, digitally by means of the controller P, for example by using a digital/analogue converter (DAC) to produce staircase waveform voltages.

The operating voltage U0 is a constant voltage and, in this exemplary embodiment, is also smoothed by a capacitor C2. Since the switches 4, 5, 6 are arranged upstream of the output amplifiers 11, 12, 13, they switch only low power levels, so that low-power transistors, in particular, can be used as the switching elements. In consequence, the three switches 4, 5, 6 can advantageously also be integrated in an IC, together with the ramp generator 7, 8, 9 and the controller P. Separate power transistors may be used as the output amplifiers 11, 12, 13. Since the winding sections 1, 2, 3 are driven directly by the output amplifiers 11, 12, 13 with low impedance, interference voltages produced in the motor 10 are effectively suppressed.

Figure 1B:
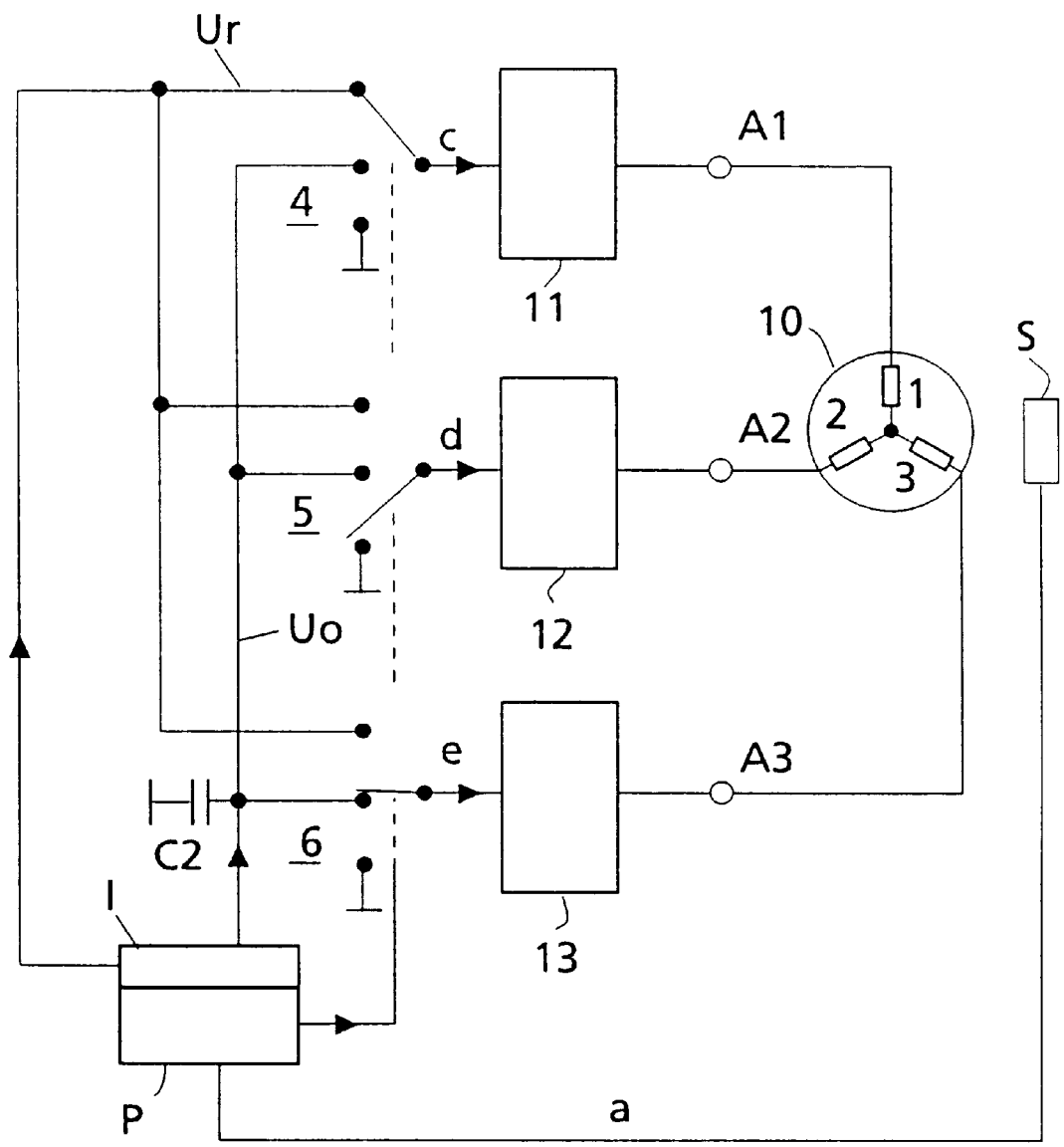
FIG. 1b shows the motor and the circuit arrangement from FIG. 1a with a sensor for regulation.

FIG. 1*b* illustrates a commutation circuit which regulates the speed of the motor 10 via a sensor S. The commutation circuit is constructed analogously to that in FIG. 1*a*, and the same items have the same reference symbols. Once again, periodic, trapezoidal waveform control signals c, d, e for driving a respective winding section 1, 2, 3 are likewise formed from a supply voltage U0, a triangular waveform ramp voltage Ur and a reference potential, in this exemplary embodiment earth. In this configuration example, the sensor S supplies a specific number of pulses a per motor revolution, these pulses being at equal time intervals, as illustrated in FIG. 2. These pulses are a measure of the position and speed of motor revolution and are used by the controller P to stabilize the motor speed or for acceleration and braking. In this exemplary embodiment, the motor is advantageously controlled by controlling the amplitude, that is to say by variation of the supply voltage U0. This is generated by the controller P via an interface I which, for example, contains a digital/analogue converter (DAC). The ramp voltage Ur is likewise produced digitally, and its frequency and amplitude can be matched by the controller P to the supply voltage U0, via the interface I, so that the switches 4, 5, 6 respectively form trapezoidal waveform control signals c, d, e that are as ideal as possible.

The production of the periodic, trapezoidal waveform control signals c, d, e in the arrangement in FIG. 1*b* will be explained in more detail with reference to FIG. 2. In this exemplary embodiment, the sensor S supplies 24 pulsed sensor signals a per motor revolution, corresponding to 360°. As described above, these pulses are used to produce the triangular waveform ramp voltage Ur, which has a period of 2 sensor pulses. The switches 4, 5, 6 in FIG. 1*b* are used to produce trapezoidal waveform control signals c, d, e from the operating voltage U0, the reference potential of earth and the ramp voltage Ur, these control signals c, d, e having a period of, for example, 6 sensor pulses, and each being phase-shifted by 2 sensor signals from one another. The switching times t1, t2, t3, t4, t5, . . . associated with the sensor signals 1, 2, 3, 4, 5, . . . are shown at the bottom in FIG. 2. A signal derived from this supply voltage or a signal generated in some other way can also be used instead of this supply voltage U0 to produce the trapezoidal waveform control signals c, d, e.

In this exemplary embodiment, the duration of the maximum and minimum amplitude of each trapezoidal waveform control signal c, d, e respectively corresponds to the time interval between two marking pulses (t2 to t4 or t5 to t7 for the voltage c). The motor can be regulated by amplitude variation, as explained with reference to FIG. 1*b*. Alternatively, it is possible to vary the width of the maximum, thus resulting in a pulse-width modulated control signal. In this case, the operating voltage U0 and the maximum amplitude of the ramp voltage Ur can be kept constant, so that the motor 10 is controlled just by pulse-width modulation (PWM). Since the times of the rising edges are unchanged, this does not change the frequency, but only the pulse width.

If there are 24 sensor pulses per motor revolution, the period of the trapezoidal waveform control signals c, d, e is in each case 6 pulses, and the respective phase shift is 2 pulses. The switches 4, 5, 6 are switched onwards alternately with a period of one or two sensor pulses, and the switch 7 is switched onwards with each sensor pulse. Alternatively, 12 sensor pulses per motor revolution may be used, for example, for commutation, the switching signals for the switch 7 being produced in the controller P in this case.

The circuit arrangements in FIGS. 1*a* and 1*b* each show a circuit arrangement for a motor having three winding sections, which represent a preferred exemplary embodiment. Other refinements of the invention can likewise be applied to a two winding motor or to motors with more than three winding sections. The circuits which are illustrated as blocks in FIGS. 1*a* and 1*b* are used only to assist understanding of the invention. They may also be formed and illustrated in other ways, as well as being integrated in different manners. The elements contained in the blocks may also be discrete.

What is claimed is:

1. Method for commutation of a multiple winding electric motor, in which a supply voltage, a reference potential and a triangular waveform ramp voltage are provided, from which switching means are used to form a periodic, trapezoidal waveform control signal by means of a controller for driving a respective winding section, and in which the switching means are arranged upstream of an output amplifier of the respective winding section, characterized in that the triangular waveform ramp voltage is produced from the output currents or voltages, respectively, of two current or voltage sources of different polarity, the amplitude of the ramp voltage corresponding to the magnitude of the supply voltage, respectively.

2. Method for commutation of a multiple winding electric motor, in which a supply voltage, a reference potential and a triangular waveform ramp voltage are provided, from which switching means are used to form a periodic, trapezoidal waveform control signal by means of a controller for driving a respective winding section, and in which the switching means are arranged upstream of an output amplifier of the respective winding section, characterized in that the triangular waveform ramp voltage is produced digitally by the controller by generating a staircase waveform voltage.

3. Circuit arrangement for commutation of a multiple winding electric motor having a controller, in which the circuit arrangement contains switching means, using which a periodic, trapezoidal waveform control signal is produced from a supply voltage, a reference potential and a triangular waveform ramp voltage, for driving a respective winding section, and in which the switching means are arranged upstream of an output amplifier of the respective winding section, characterized in that the circuit arrangement contains two current or voltage sources of different polarity, from whose output currents or voltages the triangular waveform ramp voltage is produced by periodic switching via a switch.

4. Circuit arrangement for commutation of a multiple winding electric motor having a controller, in which the circuit arrangement contains switching means, using which a periodic, trapezoidal waveform control signal is produced from a supply voltage, a reference potential and a triangular waveform ramp voltage, for driving a respective winding section, and in which the switching means are arranged upstream of an output amplifier of the respective winding section, characterized in that the trapezoidal waveform control signal for a respective winding section is produced by cyclic switching from the supply voltage, the reference potential and the ramp voltage.

5. Circuit arrangement for commutation of a multiple winding electric motor having a controller, in which the circuit arrangement contains switching means, using which a periodic, trapezoidal waveform control signal is produced from a supply voltage, a reference potential and a triangular waveform ramp voltage for driving a respective winding section, and in which said arrangement contains a sensor which is arranged on the motor, in order to regulate the motor speed and/or the commutation, characterized in that the motor has three winding sections, in that the sensor produces a number m, which can be divided by 6, of pulsed signals per revolution of the motor, in that the period of the control signals which drive the winding sections is m/4, in that the period of the triangular waveform ramp signal is m/12, and in that the switches are switched onwards alternately with a period of m/12 and m/24.

6. Method for commutation of a multiple winding electric motor, characterized in that a DC voltage, a reference potential and a triangular waveform ramp voltage are provided, from which a periodic, trapezoidal waveform control signal is formed by means of a controller and switching means, said switching means successively applying a positive ramp voltage from said triangular ramp voltage, said DC voltage, a negative ramp voltage from said triangular ramp voltage, and said reference voltage, to a respective winding.

7. Method according to claim 6, characterized in that said switching means are arranged upstream of an output amplifier of said respective winding.

8. Method according to claim 7, characterized in that said triangular waveform ramp voltage is produced from the output currents or voltages, respectively, of two current or voltage sources of different polarity, the amplitude of said ramp voltage corresponding to the magnitude of said DC voltage.

9. Method according to claim 7, characterized in that said triangular waveform ramp voltage is produced digitally by said controller by generating a staircase waveform voltage.

10. Circuit arrangement for commutation of a multiple winding electric motor, comprising a controller and switching means by which a periodic, trapezoidal waveform signal is produced from a DC voltage, a reference potential and a triangular waveform ramp voltage, means for successively switching a switch of said switching means to a positive ramp voltage from said triangular waveform ramp voltage, to said DC voltage, to a negative ramp voltage from said triangular ramp voltage, and to said reference voltage, for driving a respective winding.

11. Circuit arrangement according to claim 10, characterized in that said switching means are arranged upstream of an output amplifier of said respective winding.

12. Circuit arrangement according to claim 11, further comprising two current or voltage sources of different polarity, and means for providing said triangular waveform ramp voltage by periodic switching of said current or voltage sources via a further switch.

13. Circuit arrangement according to claim 10, further comprising a sensor which is arranged on the motor and coupled to said controller, in order to regulate the motor speed and/or the commutation.

14. Circuit arrangement according to claim 13, characterized in that said motor has three winding sections, in that said sensor produces a number m, which can be divided by 6, of pulsed signals per revolution of the motor, in that the period of the control signals which drive the winding sections is m/4, in that the period of said triangular waveform ramp signal is m/12, and in that said switching means are switched onwards alternately with a period of m/12 or m/24.

* * * * *